G. CROSBY.
ELECTRICAL SYSTEM OF DISTRIBUTION.
APPLICATION FILED FEB. 25, 1916.
1,256,207.
Patented Feb. 12, 1918.
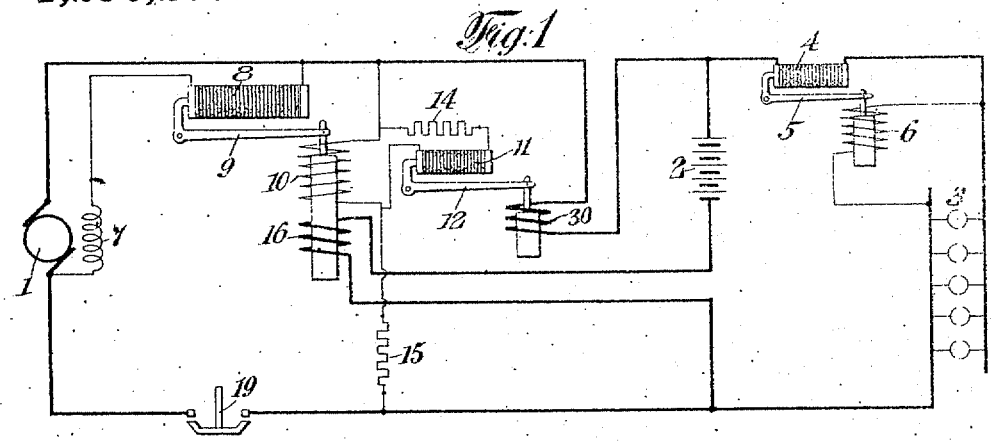
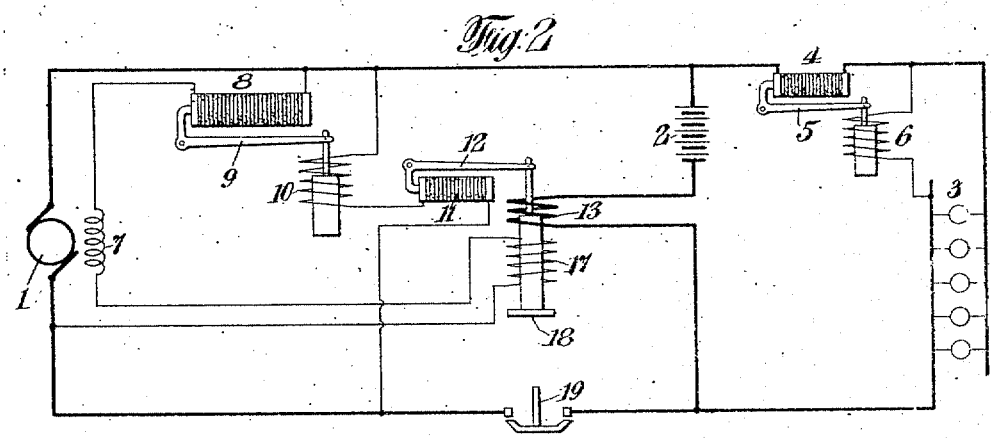
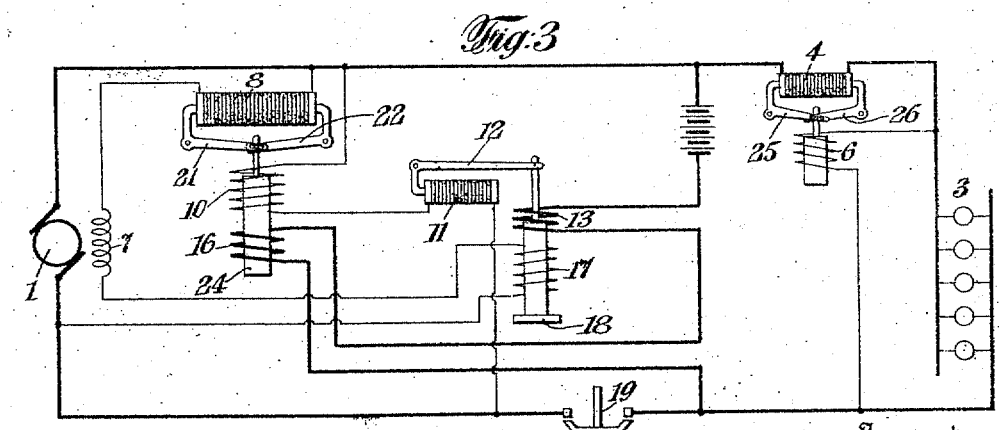
Inventor
Goham Crosby.
By his Attorneys
Kenyon & Kenyon

UNITED STATES PATENT OFFICE.

GORHAM CROSBY, OF GLEN RIDGE, NEW JERSEY, ASSIGNOR TO GOULD COUPLER COMPANY, A CORPORATION OF NEW YORK.

ELECTRICAL SYSTEM OF DISTRIBUTION.

1,256,207. Specification of Letters Patent. Patented Feb. 12, 1918.

Application filed February 25, 1916. Serial No. 80,361.

*To all whom it may concern:*

Be it known that I, GORHAM CROSBY, a citizen of the United States, residing at Glen Ridge, county of Essex, State of New Jersey, have invented certain new and useful Improvements in Electrical Systems of Distribution, of which the following is a specification.

The invention relates to improvements in electrical systems of distribution, and more particularly to systems in which the generator is adapted to charge a storage battery, and automatic means are provided for regulating the voltage to the generator. Various objects, features and advantages of the invention will more clearly appear from the detailed description given below, taken in connection with the accompanying sheet of drawings, which forms a part of this specification.

In the drawings Figure 1 is a diagram illustrating a system embodying my improvements in one form. Fig. 2 is a diagram of a similar system, showing certain modifications, and Fig. 3 is a diagram of another system, illustrating a further modification.

Referring to Fig. 1, 1 represents a generator connected to charge a storage battery 2, and supply a lamp or work circuit 3. In series between the battery 2 and lamp circuit 3 is shown a carbon pile regulator 4, operated by a lever 5, controlled by a solenoid 6, connected across the lamp circuit so as to maintain the voltage across the lamps substantially constant, irrespective of variations of voltage across the battery.

7 represents a shunt field winding of the generator 1. In series with the generator shunt field is placed a carbon pile 8, operated by a lever 9, controlled by a solenoid having a voltage coil 10, connected across the charging circuit. In shunt with coil 10 is a carbon pile 11, operated by lever 12, controlled by a solenoid having a coil 30 connected in the main generator circuit between the generator and battery. In series with the carbon pile 11 in the shunt circuit around the coil 10 is a fixed resistance 14 and in series with both the coil 10 and the pile 11 is a fixed resistance 15. The solenoid operating the lever 9 is also provided with a coil 16, connected between the generator and battery in the battery circuit, so as to be responsive to battery current changes, the coil 16 being wound to oppose the coil 10. 19 represents an automatic main switch, adapted to connect the generator to the battery and lamps when the voltage of the generator reaches the desired value, in a manner well understood by those skilled in the art.

In operation, when the battery is in a more or less charged condition, the strength of coil 30 is insufficient to raise the lever 12, so that the carbon pile 11 is compressed to its maximum, and the resistances of pile 11 and resistance 14 serve to act as a fixed resistance in parallel with the coil 10. Under these conditions the coil 10 acts to limit the generator voltage whenever it tends to vary with speed changes of the generator or otherwise. If the voltage of the generator increases above the desired value, the strength of coil 10 increases, it being connected across the generator and battery, so that the lever 9 is operated to increase the resistance of pile 8, to weaken the generator field, and so acts to limit the generator voltage. With the generator voltage thus limited, when the battery becomes more or less substantially charged, the charging current will decrease, so that coil 16 becomes weaker. This decreases the opposing force of coil 16, so that coil 10 becomes effective to limit the generator voltage to a lesser value. This action causes a rapid tapering off of the charging current, at the end of the battery charging period.

At the beginning of the battery charging period, with the battery in a more or less discharged condition, should the battery tend to take too great a current, coil 13 will act to raise the lever 12 and increase the resistance of pile 11, so that more current is shunted through the coil 10, making it effective to operate pile 8, and lessen the generator voltage, so that the current in coil 30 is thus limited. When the coil 30 is thus acting to operate the pile 11, the generator voltage is regulated responsive to current changes in the coil 30, since the changes in voltage across the charging circuit and impressed upon the circuit of coil 10 are insignificant as compared with the changes produced by the current in coil 10, by the action of the current controlled regulating element 11. At this time the current in coil 16 is for any given lamp load constant, being unaffected by speed changes. It therefore has no effect upon the operation, the utility of coil 16 being that when the coil 30 is below its regulating value so that the coil 10 is regulating by the changes of voltage of the system directly affecting it, then coil 16 adjusts the value of the potential that coil 10 will keep constant, reducing that value as battery current decreases.

The arrangement shown in Fig. 2 is substantially the same, except that the coil 16 and resistances 14 and 15 are omitted, and the pile 11 is placed in series with the coil 10, a stop 18 being provided for the core of the solenoid 13 to limit the downward movement of the lever 12. Normally coil 10 operates the regulating element 8, to regulate the generator voltage responsive to voltage changes in the system applied to the coil 10, without being affected by the action of the coil 13, which is too weak to raise its core and operate the pile 11. If the battery be in a more or less discharged condition, and tends to take too great a current, coil 13 will raise the lever 12 and compress the pile 11, so as to decrease the resistance in circuit with the coil 10, thus causing it to operate the pile 8 responsive to current changes in coil 13, to limit the current to the desired value. Extra coil 17 is wound on the same solenoid with the coil 13, and is connected in series with the shunt field winding 7, so that at the higher speeds of the generator, when the field current is greatly weakened by the action of regulating element 8, coil 7 is weakened and being wound to oppose coil 13, acts to make coil 13 effective to operate the pile 11 with a lesser current therein, so that at the higher speeds, the maximum current which may be delivered is considerably decreased, to improve the generator commutation.

Referring to Fig. 3, the arrangement is similar to that shown in Figs. 1 and 2, except that instead of operating the carbon pile element 8 with a single lever, it is operated by means of two levers 21 and 22, one operating upon one end of the pile and the other operating upon the other end of the pile. The ends of the long arms of these levers are connected to a stem 23 of the core 24 of the solenoid of coils 10 and 16, by means of a pin and slot connection, so that upon the raising of the core 24 by the solenoid, both levers 21 and 22 act to increase the resistance of the pile 8 at both ends thereof simultaneously. Also, in a similar manner, the plunger of coil 6 of the lamp regulator is made to operate upon both ends of the carbon pile 4, by levers 25 and 26.

It will be obvious to those skilled in the art that many other changes and modifications may be made without departing from the spirit and scope of the invention. Accordingly I desire to cover all systems which come within the language of the appended claims.

Having described my invention what I claim as new and desire to secure by Letters Patent is:

1. An electrical system of distribution having in combination a generator, a storage battery connected to be charged thereby, a regulating element for regulating the generator voltage by varying its field strength, a voltage coil normally operating said element responsive to voltage variations of the system applied to said coil, whereby the generator is regulated responsive to voltage changes of the system applied to said coil, a current coil connected between the generator and battery opposing the action of said voltage coil, a regulating element for varying the strength of said voltage coil but normally substantially ineffective on said voltage coil and a current coil connected between the generator and battery and adapted upon the current therein exceeding a predetermined value to operate said second regulating element to vary the current in said voltage coil so that the generator voltage is regulated responsive to current changes instead of voltage changes of the system.

2. An electrical system of distribution having in combination, a generator, a storage battery connected to be charged thereby, a regulating element for regulating the generator voltage, a voltage coil connected across the charging circuit and normally operating said element directly responsive to voltage variations across the charging circuit whereby the generator is regulated responsive to voltage changes directly by said coil, a coil in the battery circuit opposing said voltage coil, a variable resistance in shunt to said voltage coil and adapted upon being operated to vary the current in said voltage coil and a current coil connected between the generator and battery and adapted upon the current therein exceeding a predetermined value to control said variable resistance to vary the current in said voltage coil so that the generator voltage is regulated responsive to current changes substantially independently of voltage changes across the charging current.

3. An electrical system of distribution having in combination, a generator, a storage battery connected to be charged thereby, a carbon pile in the generator field circuit for regulating the generator voltage, a voltage coil connected across the charging circuit and normally operating said pile directly responsive to voltage variations across the charging circuit whereby the generator is regulated responsive to voltage changes directly by said coil, a current coil in the battery circuit coöperating with said voltage coil to more rapidly cut down the charging current to the battery as it becomes charged, a carbon pile adapted upon being operated to vary the current in said voltage coil and a current coil connected between the generator and battery and adapted upon the current therein exceeding a predetermined value to control said second carbon pile to vary the current in said voltage coil so that the generator voltage is regulated responsive to current changes substantially independently of voltage changes across the charging circuit.

In testimony whereof, I have signed my name to this specification.

GORHAM CROSBY.